(12) United States Patent
Shiokawa et al.

(10) Patent No.: US 7,972,047 B2
(45) Date of Patent: Jul. 5, 2011

(54) HEADLIGHT UNIT

(75) Inventors: Tatsuya Shiokawa, Saitama (JP); Koji Aoki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 442 days.

(21) Appl. No.: 12/122,204

(22) Filed: May 16, 2008

(65) Prior Publication Data

US 2008/0316762 A1 Dec. 25, 2008

(30) Foreign Application Priority Data

Jun. 19, 2007 (JP) ................................. 2007-161292

(51) Int. Cl.
*B60Q 1/06* (2006.01)
*F21S 8/10* (2006.01)

(52) U.S. Cl. ........ 362/525; 362/476; 362/523; 362/546; 362/548; 362/549

(58) Field of Classification Search .......... 362/460–468, 362/469–472, 473, 475, 476, 523, 525, 529–532, 362/474, 477–522, 524, 526, 533–549
See application file for complete search history.

(56) References Cited

U.S. PATENT DOCUMENTS

| 4,625,264 | A |   | 11/1986 | Nagashima |           |
|-----------|---|---|---------|-----------|-----------|
| 4,722,029 | A | * | 1/1988  | Ahle et al. | 362/528 |
| 6,264,354 | B1| * | 7/2001  | Motilal   | 362/505   |
| 2007/0236949 | A1 | * | 10/2007 | Kurihara | 362/475 |

FOREIGN PATENT DOCUMENTS

| JP | 8-161906 A     | 6/1996  |
|----|----------------|---------|
| JP | 2005-280576 A  | 10/2005 |

* cited by examiner

*Primary Examiner* — Diane I Lee
*Assistant Examiner* — William J Carter
(74) *Attorney, Agent, or Firm* — Birch, Stewart, Kolasch & Birch, LLP (57) ABSTRACT

A headlight unit having a virtual pivot center provided at a position different from a supported position to a vehicle body. Two, upper and lower headlight supporting portions spaced apart from each other are provided at a rear portion of a headlight unit The upper headlight supporting portion on each side includes a guide shaft formed on a support member of a radiator cover and a groove formed on an upper base portion of the headlight unit. The lower headlight supporting portion on each side includes an elongated hole formed through the support member of the radiator cover and a bolt threadedly engaged with a lower base portion of the headlight unit. The guide shaft and the bolt slide in the groove and the elongated hole, respectively, for performing the swing motion of the headlight unit about the virtual pivot center C to perform an adjustment of an optical axis.

20 Claims, 5 Drawing Sheets

HEADLIGHT UNIT

CROSS-REFERENCE TO RELATED APPLICATIONS

The present application claims priority under 35 USC 119 to Japanese Patent Application No. 2007-161292 filed on Jun. 19, 2007 the entire contents of which are hereby incorporated by reference.

BACKGROUND OF THE INVENTION

1. Field of the Invention

The present invention relates to a headlight unit. More particularly, to a headlight unit having a virtual pivot center provided at a position different from a supported position to a vehicle body, wherein a lamp body is swung about the virtual pivot center to thereby perform the adjustment of an optical axis.

2. Description of Background Art

A first type of an optical axis adjusting mechanism for a headlight unit for a vehicle is known wherein the whole of a lamp body is swung about a predetermined pivot shaft. A second type of an adjusting mechanism is known wherein a movable reflector is provided in a lamp body and only the reflector is moved. The first type of adjusting mechanism can be realized by a relatively simple configuration and it is widely used in a saddle seat type vehicle or the like.

Japanese Patent Laid-Open No. 2005-280576 discloses a light unit for a vehicle having a configuration such that a pair of support shafts are provided on the laterally opposite side surfaces of a lamp body at a substantially central position thereof and the whole of the lamp body is swung about the support shafts to thereby perform the vertical adjustment of an optical axis.

However, in the configuration disclosed in Japanese Patent Laid-Open No. 2005-280576, the vertical movement of the lamp body is larger with an increase in the distance from the position of the support shafts. For example, in the case wherein another part is provided close to a lens formed at the front end portion of the lamp body, an extra clearance must be preliminarily left between the lens and the surrounding part in consideration of the range of the vertical movement of the lamp body, thus causing design and structural limitations.

SUMMARY AND OBJECTS OF THE INVENTION

It is accordingly an object of an embodiment of the present invention to provide a headlight unit having a virtual pivot center provided at a position different from a supported position to a vehicle body, wherein the lamp body is swung about the virtual pivot center to thereby perform the adjustment of an optical axis.

In accordance with an embodiment of the present invention, there is provided a headlight unit swingably supported to a support member of a vehicle body, wherein the vertical adjustment of an optical axis is performed by swinging the headlight unit. The headlight unit includes at least two, upper and lower headlight supporting portions spaced apart from each other at a rear portion of the headlight unit with each of the upper and lower headlight supporting portions being composed of an elongated hole formed in one of the headlight unit and the support member and a guide shaft provided on the other of the headlight unit and the support member and engaged with the elongated hole. The elongated holes formed at the upper and lower headlight supporting portions arcuately extends along the arcs of concentric circles about a virtual pivot center. The guide shafts provided at the upper and lower headlight supporting portions are adapted to slide in the respective elongated holes to thereby perform the swing motion of the headlight unit about the virtual pivot center.

In accordance with an embodiment of the present invention, the support member is integral with a body cover as a part of the vehicle body; and the upper headlight supporting portion is composed of an elongated hole as a groove formed on the headlight unit and a guide shaft formed on the support member.

In accordance with an embodiment of the present invention, the inner wall of the elongated hole is formed with an opening for allowing the engagement of the guide shaft into the elongated hole.

In accordance with an embodiment of the present invention, the lower headlight supporting portion is composed of a guide shaft as a mounting screw threadedly engaged with the headlight unit and an elongated hole formed through the support member. The mounting screw is tightened to fix the headlight unit to the support member at a predetermined position.

In accordance with an embodiment of the present invention, a front portion of the headlight unit is exposed from an opening of an exterior part of the vehicle body. The virtual pivot center is located in the vicinity of the opening of the exterior part.

According to an embodiment of the present invention, at least two, upper and lower headlight supporting portions spaced apart from each other are provided at a rear portion of the headlight unit. Each of the upper and lower headlight supporting portions is composed of an elongated hole formed in one of the headlight unit and the support member and a guide shaft provided on the other of the headlight unit and the support member and engaged with the elongated hole. The elongated holes formed at the upper and lower headlight supporting portions arcuately extend along the arcs of concentric circles about a virtual pivot center. The guide shafts provided at the upper and lower headlight supporting portions are adapted to slide in the respective elongated holes to thereby perform the swing motion of the headlight unit about the virtual pivot center. Accordingly, the virtual pivot center about which the headlight unit is swung can be arbitrarily set, so that the virtual pivot center can be provided at a position different from the position of each headlight supporting portion. Even when each headlight supporting portion is provided at the rear portion of the headlight unit, the amount of movement of the front portion of the headlight unit by the swing motion thereof can be reduced by providing the virtual pivot center at the front portion of the headlight unit.

According to an embodiment of the present invention, the support member is integral with a body cover as a part of the vehicle body, and the upper headlight supporting portion is composed of an elongated hole as a groove formed on the headlight unit and a guide shaft formed on the support member. Accordingly, the body cover can be utilized as the support member for supporting the headlight unit, so that the number of parts can be reduced. Further, a supporting structure for the headlight unit can be obtained by a simple configuration composed of the elongated hole and the guide shaft.

According to an embodiment of the present invention, the inner wall of the elongated hole is formed with an opening for allowing the engagement of the guide shaft into the elongated hole. Accordingly, the guide shaft can be easily engaged into the elongated hole, so that the number of man-hours for assembly of the headlight unit can be reduced.

According to an embodiment of the present invention, the lower headlight supporting portion is composed of a guide shaft as a mounting screw threadedly engaged with the headlight unit and an elongated hole formed through the support member. The mounting screw is tightened to thereby fix the headlight unit to the support member at a predetermined position. Accordingly, the mounting screw for setting the predetermined position of the headlight unit can be made to serve also as the guide shaft, so that the number of parts can be reduced to obtain a headlight supporting structure with a simple configuration.

According to an embodiment of the present invention, a front portion of the headlight unit is exposed from an opening of an exterior part of the vehicle body, and the virtual pivot center is located in the vicinity of the opening of the exterior part. Accordingly, the amount of movement of the headlight unit in the vicinity of the opening of the exterior part can be reduced in performing the adjustment of an optical axis. As a result, the interference between the headlight unit and the exterior part in the vicinity of the opening thereof can be suppressed and the flexibility of design can be increased. Further, the clearance between the headlight and the exterior part can be reduced to thereby provide a high-level appearance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
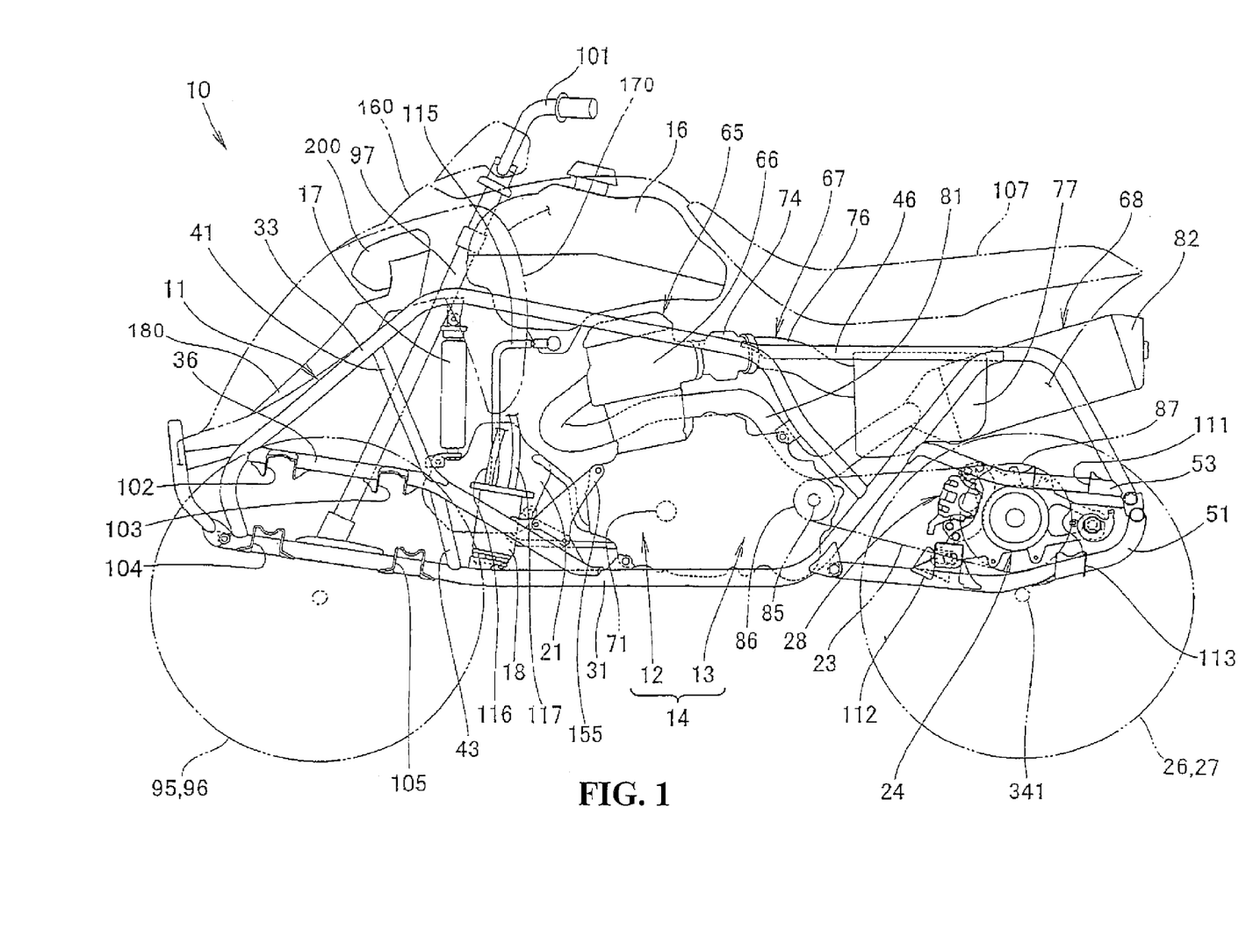
FIG. 1 is a side view of a saddle seat type vehicle according to a preferred embodiment of the present invention.

A preferred embodiment of the present invention will now be described in detail with reference to the drawings. FIG. 1 is a side view of a saddle seat type vehicle 10 according to a preferred embodiment of the present invention. The saddle seat type vehicle 10 is a four-wheel vehicle for rough road running. The vehicle 10 has a body frame 11 and a power unit 14 mounted on the body frame 11 at a substantially central portion thereof. The power unit 14 is composed of an engine 12 and a transmission 13 formed integrally therewith. A fuel tank 16 is located above the power unit 14. A fuel pump 18 for supplying a fuel stored in the fuel tank 16 to the engine 12 and an oil tank 21 for storing a lubricating oil to be used in the power unit 14 are located in a space below the fuel tank 16 and between a radiator 17 and the power unit 14. A speed reducing unit 24 is located on the rear side of the power unit 14, wherein the power output from the power unit 14 is transmitted through a drive chain 23 to the speed reducing unit 24. The speed reducing unit 24 is provided with a disc brake unit 28 for braking a pair of right and left rear wheels 26 and 27.

A fuel hose is connected to the fuel tank 16 and the fuel pump 18. More specifically, this fuel hose is composed of a fuel supply pipe 115 for supplying the fuel from the fuel tank 16 to the fuel pump 18, a fuel supply pipe 116 for supplying the fuel from the fuel pump 18 to an injector (not shown) mounted on a throttle body 74, and a return pipe 117 for returning the fuel from the fuel pump 18 to the fuel tank 16.

The body frame 11 includes a pair of right and left lower main frames 31 for supporting the power unit 14, a pair of right and left upper main frames 33 respectively mounted to the right and left lower main frames 31 at their front ends and rear portions with a pair of right and left inclined frames 36 respectively extending from the front portions of the right and left upper main frames 33 to the intermediate portions of the right and left lower main frames 31 so as to be inclined downward toward the rear side of the vehicle. A pair of right and left upper reinforcing frames 41 are provided respectively connecting the right and left inclined frames 36 to the right and left upper main frames 33 with a pair of right and left lower reinforcing frames 43 respectively connecting the right and left inclined frames 36 to the right and left lower main frames 31. A pair of right and left rear upper frames 46 are provided respectively mounted to the rear upper portions of the right and left upper main frames 33 and the rear ends of the right and left lower main frames 31 with a pair of right and left rear lower frames 51 respectively connecting the rear ends of the right and left rear upper frames 46 to the rear lower portions of the right and left lower main frames 31. A pair of right and left rear subframes 53 are provided respectively mounted to the rear portions of the right and left lower main frames 31 and the rear ends of the right and left rear upper frames 46.

The engine 12 has an upward projecting cylinder portion 65 including a cylinder head 66. An intake unit 67 and an exhaust unit 68 are mounted to the cylinder head 66. The engine 12 has a crankshaft 71 and is mounted to the body frame 11 by an engine hanger 155. The intake unit 67 is composed of the throttle body 74 mounted to the rear portion of the cylinder head 66 and an air cleaner 77 connected through a connecting tube 76 to the throttle body 74. The exhaust unit 68 is composed of an exhaust pipe 81 mounted at one end thereof to the cylinder head 66 and a muffler 82 connected to the other end of the exhaust pipe 81.

An output shaft 85 projects from a side portion of the transmission 13 with a drive sprocket 86 mounted on the output shaft 85. A driven sprocket 87 is mounted to the speed reducing unit 24 with an endless drive chain 23 being wrapped between the drive sprocket 86 and the driven sprocket 87. A pair of right and left front wheels 95 and 96 are connected to a steering shaft 97 rotatably mounted to the body frame 11. A bar handle 101 is mounted to the upper end of the steering shaft 97, so that the front wheels 95 and 96 are steerable by operating the bar handle 101. A seat 107 for an operator or passenger is provided on the rear side of the fuel tank 16.

Front suspension arm brackets 102, 103, 104, and 105 for mounting front suspension arms (not shown) for the front wheels 95 and 96 are provided at the front lower portion of the body frame 11. Similarly, rear suspension arm brackets 111, 112, and 113 for mounting rear suspension arms (not shown)

for the rear wheels 26 and 27 are provided at the rear lower portion of the body frame 11. The rear wheels 26 and 27 are mounted on a rear axle 341.

A headlight unit 200 as a headlamp is mounted on the front side of the steering shaft 97 at the laterally central position of the vehicle body. The headlight unit 200 is supported to a radiator cover 180 as a body cover fixed to the body frame 11. A top cover 160 as an exterior part is provided above the headlight unit 200, and a front fender 170 as a mud guard for covering the upper side of the front wheels 95 and 96 is mounted on the laterally outside of the radiator cover 180.

Figure 2:
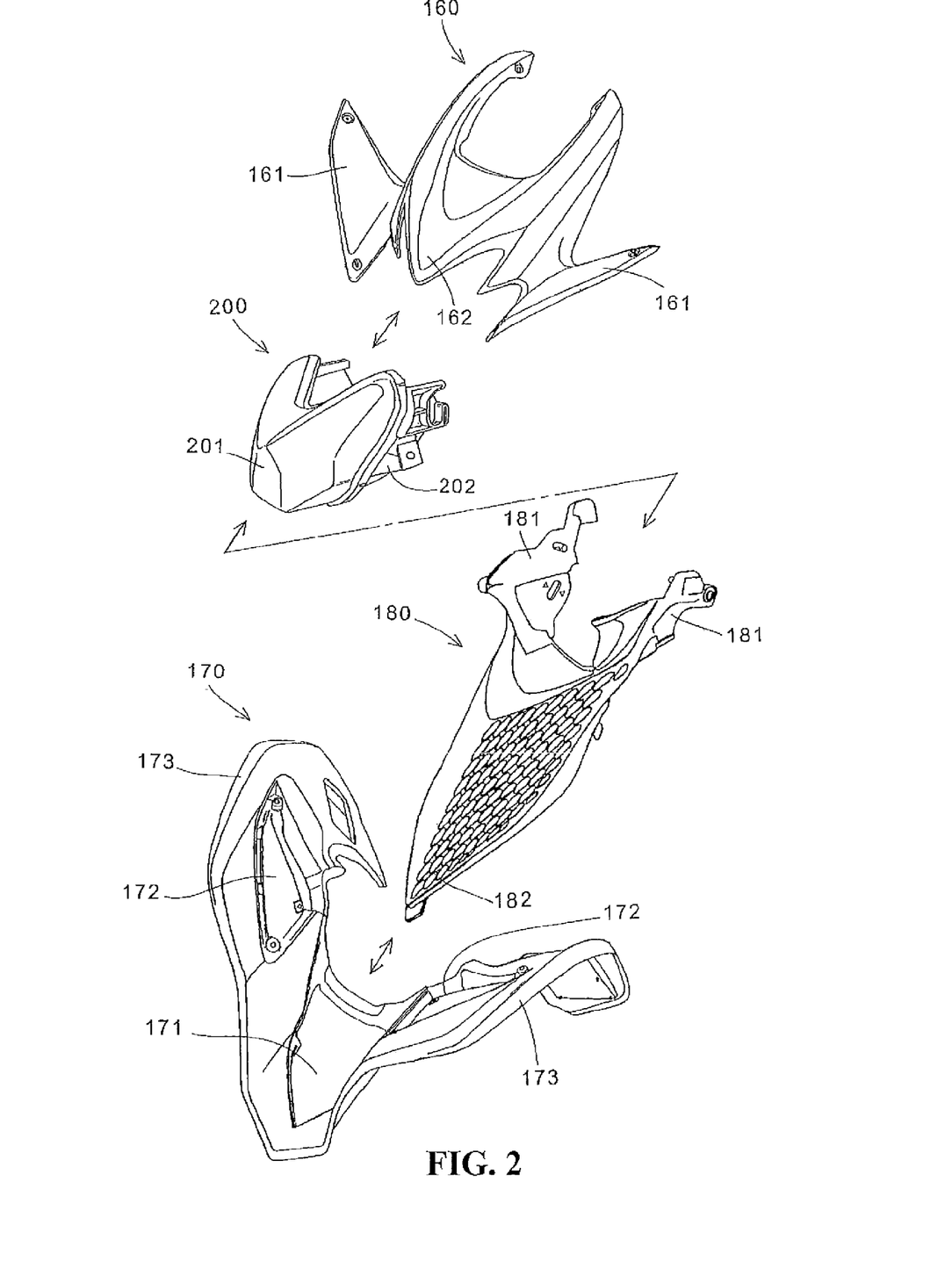
FIG. 2 is a perspective view showing the arrangement of a headlight unit and its associated exterior parts.

FIG. 2 is a perspective view showing the arrangement of the top cover 160, the headlight unit 200, the radiator cover 180, and the front fender 170. The top cover 160 is formed from a thin plate of resin or the like, and it is formed with a frontward extending portion 162 extending so as to follow the shape of the upper portion of the headlight unit 200 and a pair of right and left projecting portions 161 projecting from the frontward extending portion 162 in the laterally opposite directions. The headlight unit 200 is composed of a housing 202 and a lens 201 mounted on the front side of the housing 202. The housing 202 contains a bulb and a reflector. The headlight unit 200 according to this preferred embodiment is of a multireflector type such that light is distributed by a reflector having multiple reflection surfaces, and has a lamp body shape such that the longitudinal size of the lamp body is larger than the vertical size and lateral size of the lamp body.

The radiator cover 180 is provided on the front side of the radiator 17 (see FIG. 1). The radiator cover 180 has a body portion 182 having many vent holes for introducing an air flow to the radiator 17 and a pair of right and left support members 181 formed at the upper end of the body portion 182 for supporting the headlight unit 200 at its right and left portions. The front fender 170 has a pair of right and left mud guard portions 173 for covering the upper side of the front wheels 95 and 96. The front fender 170 is formed with a central engagement hole 171 and a pair of right and left engagement recesses 172 formed at the mud guard portions 173 for engaging the right and left projecting portions 161 of the top cover 160.

The above-mentioned four parts 160, 200, 180, and 170 are assembled in the following manner. First, the body portion 182 of the radiator cover 180 is engaged into the engagement hole 171 of the front fender 170. Thereafter, the headlight unit 200 is inserted between the right and left support members 181 of the radiator cover 180 and fixed thereto. Thereafter, the top cover 160 is placed on the upper portion of the headlight unit 200, and the right and left projecting portions 161 of the top cover 160 are respectively engaged to the right and left engagement recesses 172 of the front fender 172 and fixed thereto. Thus, the front end portion of the saddle seat type vehicle 10 is configured by the assembly of these four parts 160, 200, 180, and 170, and the lens 201 of the headlight unit 200 is exposed to the front side of the vehicle 10 from an opening formed at a substantially central position of the front end portion of the vehicle 10.

Figure 3:
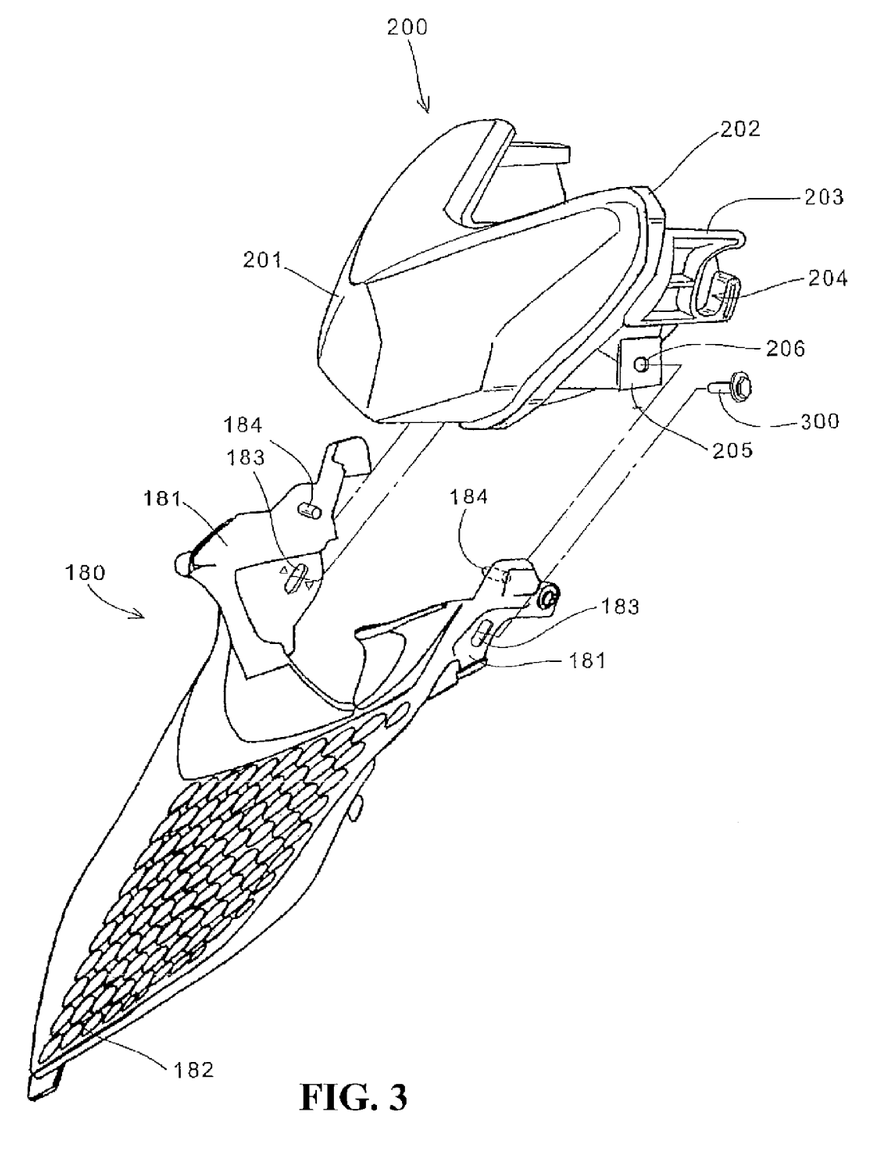
FIG. 3 is a perspective view showing the engagement of the headlight unit and a radiator cover as one of the exterior parts.

FIG. 3 is a perspective view showing the engagement of the headlight unit 200 and the radiator cover 180. In FIG. 3, the same reference symbols as those shown in FIG. 2 denote the same or like parts. The radiator cover 180 is formed with a pair of right and left guide shafts 184 and a pair of right and left elongated holes 183 below the right and left guide shafts 184. The right and left guide shafts 184 project laterally inward from the inside surfaces of the right and left support members 181 at their upper portions. The right and left elongated holes 183 are formed through the right and left support members 181 at their lower portions. The right and left guide shafts 184 are symmetrical with respect to a laterally central plane of the radiator cover 180, and the right and left elongated holes 183 are also symmetrical with respect to this laterally central plane. On the other hand, the housing 202 of the headlight unit 200 has a pair of right and left upper base portions 203 and a pair of right and left lower base portions 205. Each of the right and left upper base portions 203 is formed with a groove 204, and each of the right and left lower base portions 205 is formed with a bolt hole 206 for insertion of a bolt 300 as a mounting screw. The right and left grooves 204 are symmetrical with respect to a laterally central plane of the headlight unit 200, and the right and left bolt holes 206 are also symmetrical with respect to this laterally central plane.

The radiator cover 180 and the headlight unit 200 are connected in the following manner. First, the right and left guide shafts 184 of the radiator cover 180 are respectively engaged into the right and left grooves 204 of the headlight unit 200. Thereafter, the right and left bolt holes 206 of the headlight unit 200 are respectively aligned to the right and left elongated holes 183 of the radiator cover 180. In this condition, the bolt 300 is inserted into each bolt hole 206 and each elongated hole 183 from the laterally outside of the radiator cover 180. In this preferred embodiment, a holding member having an internal screw thread (not shown) is provided inside of each lower base portion 205 of the headlight unit 200, and the bolt 300 is threadedly engaged with each holding member to thereby fix the headlight unit 200 to the radiator cover 180 at a predetermined position.

In this preferred embodiment, the headlight unit 200 is supported to the radiator cover 180 at an upper supporting portion composed of the right and left grooves 204 and the right and left guide shafts 184 and at a lower supporting portion composed of the right and left elongated holes 183 and the right and left bolts 300. In other words, the headlight unit 200 is supported to the radiator cover 180 at two, upper and lower supporting portions each composed of an elongated hole and a guide shaft engaged with the elongated hole. By loosening each bolt 300, the headlight unit 200 can be moved in a limited range where the guide shaft is slidable in the elongated hole. Thus, the whole of the lamp body can be swung vertically (about a horizontal axis) to allow the vertical adjustment of an optical axis. Each bolt 300 can be loosened by using any suitable tool from the back side (the lateral inside) of each mud guard portion 173 of the front fender 170 without removing any other parts.

In this preferred embodiment, the upper portion of each groove 204 of the headlight unit 200 is open. Accordingly, each guide shaft 184 of the radiator cover 180 can be smoothly engaged into the corresponding groove 204 from its upper open portion. Even in the case that such an upper open portion is not formed in each groove 204, each guide shaft 184 can be easily engaged into the corresponding groove 204 by temporarily elastically deforming each support member 181 in the laterally outward direction. Each guide shaft 184 may be formed separately from the radiator cover 180.

Figure 4:
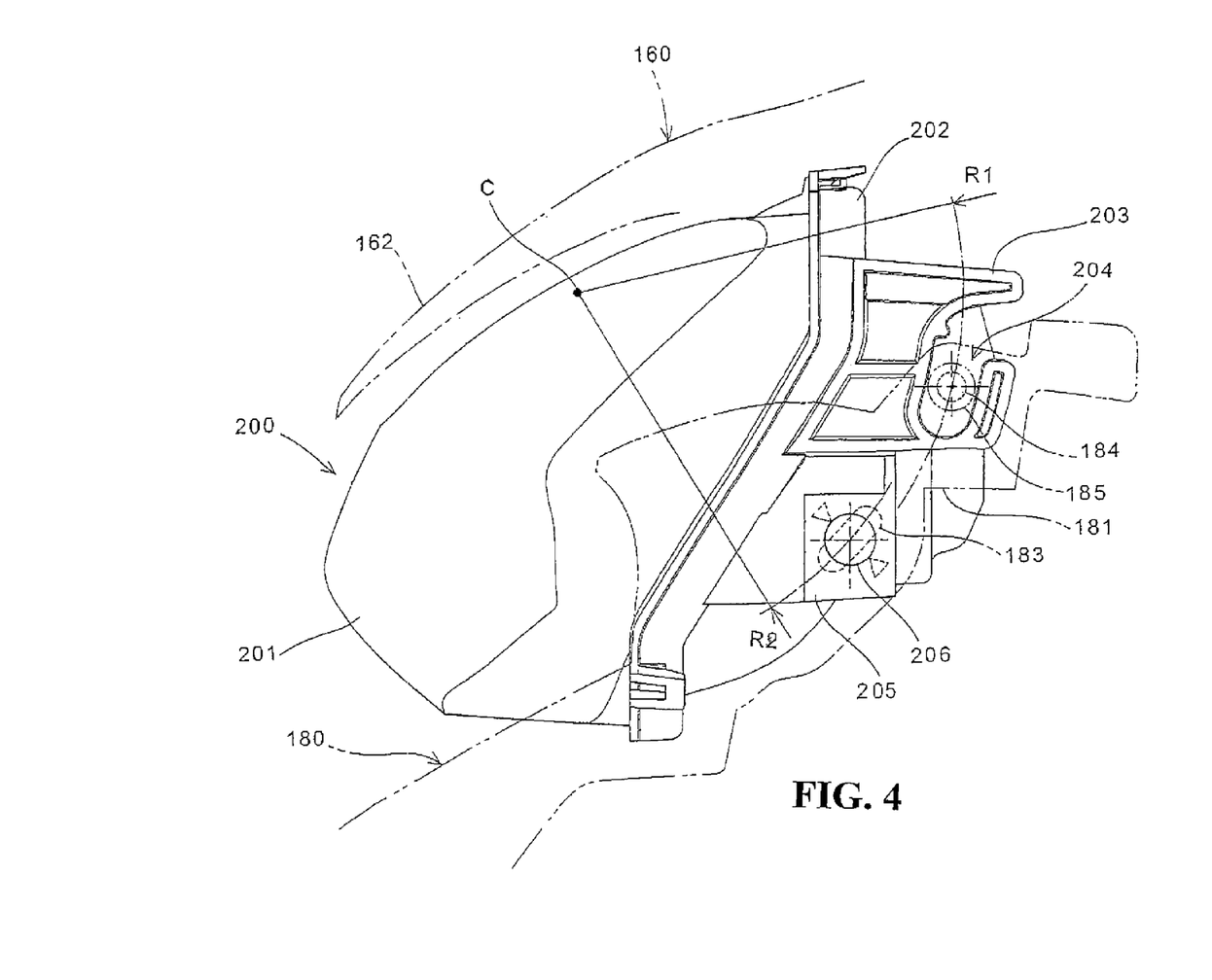
FIG. 4 is a side view illustrating details on the engagement of the headlight unit and the radiator cover.
Figure 5:
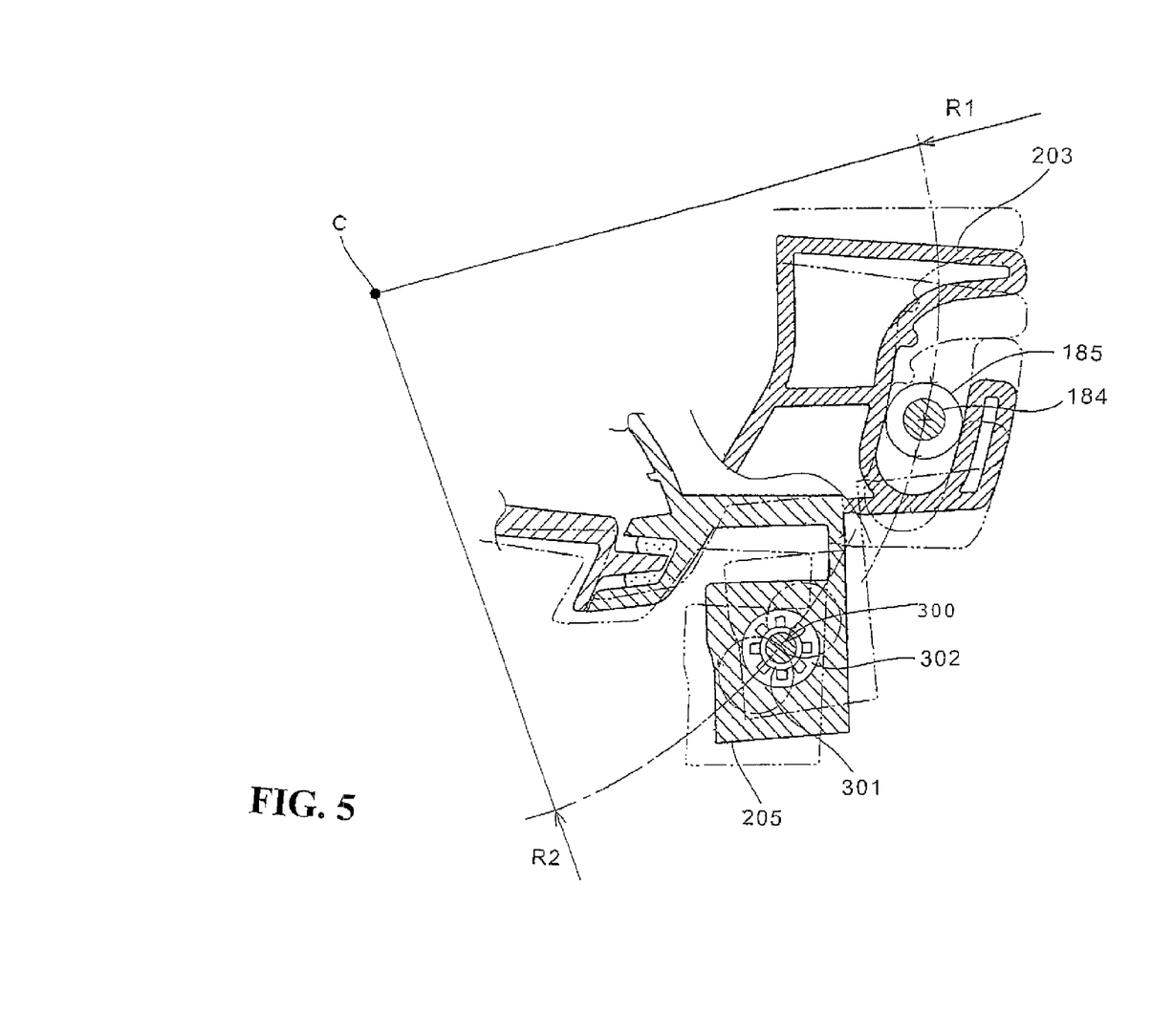
FIG. 5 is an enlarged sectional view of an essential part showing a swing motion of the headlight unit.

FIG. 4 is a side view illustrating details on the arrangement of the headlight unit 200 and the radiator cover 180. FIG. 5 is an enlarged sectional view of an essential part showing a swing motion of the headlight unit 200. The headlight unit according to the present invention is characterized in that the elongated holes of the upper and lower headlight supporting portions arcuately extend along the arcs of concentric circles about a virtual pivot center C, thereby allowing the pivotal motion of the headlight unit about the virtual pivot center C. In this preferred embodiment, the upper headlight supporting portion has each groove 204 arcuately extending along the first arc having a radius R1 about the virtual pivot center C, and the lower headlight supporting portion has each elongated hole 183 arcuately extending along the second arc having a radius R2 slightly smaller than the radius R1 about the virtual pivot center C. Further, each guide shaft 184 is engaged with the corresponding groove 204, and each bolt 300 functioning as a guide shaft is engaged with the corresponding elongated hole 183. In this preferred embodiment, the reason for the setting that the radius R2 of the second arc applied to the lower headlight supporting portion is set smaller than the radius R1 of the first arc applied to the upper headlight supporting portion is to avoid the interference between the headlight unit 200 and the body frame by locating each lower base portion 205 on the front upper side of the body frame. The ratio in radius between the first and second arcs mentioned above may be variously changed.

In the upper headlight supporting portion, a cylindrical bushing 185 formed of resin or the like is engaged with the guide shaft 184 to thereby avoid an excess spacing between the guide shaft 184 and the inner wall of the groove 204. In the lower headlight supporting portion, a cylindrical collar 301 formed of metal or the like is fitted with the threaded portion of the bolt 300. When the headlight unit 200 is swung, the outer wall of the cylindrical collar 301 slides on the inner wall of the elongated hole 183, thereby allowing a smooth slide motion of the guide shaft in the elongated hole. Further, a vibration isolation bushing 302 is fixed inside of each lower base portion 205. In addition, the cylindrical collar 301 is supported to the vibration isolation bushing 302 to thereby suppress the transmission of vibrations to the headlight unit 200.

It is sufficient that the two elongated holes formed at the upper and lower headlight supporting portions arcuately extend along the arcs of concentric circles about the virtual pivot center C. For example, the two elongated holes may arcuately extend along the arcs of the same circle about the virtual pivot center C. Further, the radius R2 of the second arc applied to the lower headlight supporting portion may be set larger than the radius R1 of the first arc applied to the upper headlight supporting portion. Further, three or more headlight supporting portions each composed of an elongated hole and a guide shaft may be provided.

As described above, the headlight unit 200 is vertically swingable about the virtual pivot center C that is arbitrarily set. In this preferred embodiment, the virtual pivot center C is set at a front upper portion of the headlight unit 200, so that the movement of the front upper portion of the lamp body can be minimized in performing the optical axis adjustment. Accordingly, in spite of the design shown in FIG. 4 such that the headlight unit 200 is located close to the top cover 160 so that the upper portion of the lens 201 is covered with the frontward extending portion 162, it is unnecessary to leave an extra clearance between the frontward extending portion 162 and the lens 201 for preventing the interference therebetween. As a result, the flexibility of the design of the top cover 160 and the headlight unit 200 can be increased.

Further, in the design shown in FIG. 4 such that the headlight unit 200 is exposed from the space surrounded by the top cover 160 and the radiator cover 180, that is, in the design such that a headlight is exposed from an opening formed in an exterior part, the impression of an external appearance is prone to largely change with a change in clearance between the headlight and the exterior part in the vicinity of the opening. Accordingly, reducing the vertical movement of the lamp body in the vicinity of the opening by locating the virtual pivot center C in the vicinity of the opening is greatly preferable from the viewpoint of design. Further, since the clearance between the headlight and the exterior part in the vicinity of the opening is reduced, the inside of the opening is hard to see through the clearance, and the feeling of integration of parts can be improved to thereby provide a high-level appearance.

Various modifications may be made to the configuration and arrangement of the elongated holes and the guide shafts provided in the headlight unit and the body cover, the position of the virtual pivot center, and the shapes of the headlight unit and the various exterior parts. For example, the headlight unit according to the present invention is applicable also to any other saddle seat type vehicles such as a motorcycle and a three-wheel vehicle and further applicable to a vehicle having a compartment. Further, the headlight unit according to the present invention is applicable to a vehicle having a plurality of lamp bodies in the headlight.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A headlight unit swingably supported on a support member of a vehicle body, wherein a vertical adjustment of an optical axis is performed by swinging said headlight unit comprising:

at least two, upper and lower headlight supporting portions spaced apart from each other at a rear portion of said headlight unit; and each of said upper and lower headlight supporting portions being composed of elongated holes formed in one of said headlight unit and said support member and a guide shaft provided on the other of said headlight unit and said support member and engaged with said elongated holes;

said elongated holes formed at each of said upper and lower headlight supporting portions arcuately extending along the arcs of concentric circles about a virtual pivot center;

said guide shaft provided at each of said upper and lower headlight supporting portions being adapted to slide in said respective elongated holes to perform the swing motion of said headlight unit about said virtual pivot center, wherein the elongated holes formed at the upper headlight supporting portions arcuately extend along an arc having a first predetermined radius and the elongated holes formed in the lower headlight supporting portions arcuately extend along an arc having a second predetermined radius that is smaller relative to the first predetermined radius.

2. The headlight unit according to claim 1, wherein said support member is integral with a body cover as a part of said vehicle body; and said elongated holes of said upper headlight supporting portion are grooves formed on said headlight unit and the guide shaft of the upper headlight supporting portion is formed on said support member.

3. The headlight unit according to claim 2, wherein the inner wall of said elongated holes of the upper headlight supporting portion are formed with openings, said guide shaft being adapted to engage with the openings.

4. The headlight unit according to claim 2, wherein said guide shaft of said lower headlight supporting portion includes at least one mounting screw threadedly engaged with said headlight unit and at least one of the elongated holes formed through said support member;

said at least one mounting screw being tightened to fix said headlight unit to said support member at a predetermined position.

5. The headlight unit according to claim 1, wherein
a front portion of said headlight unit is exposed from an opening of an exterior part of said vehicle body;
said virtual pivot center being located in the vicinity of said opening of said exterior part.

6. The headlight unit according to claim 1, wherein said support member is a radiator cover and the elongated holes in the upper headlight supporting portions are grooves formed in the headlight unit for accommodating the guide shaft formed in the radiator cover and the elongated holes in the lower headlight supporting portions are elongated holes formed in the radiator cover for accommodating a connector for securing the headlight unit to the radiator cover.

7. The headlight unit according to claim 1, wherein the headlight unit includes a lower base portion and said first predetermined radius is larger relative to the second predetermined radius for positioning the lower base portion on a front upper side of a body frame.

8. The headlight unit according to claim 1, wherein the elongated holes in the upper supporting portions of the headlight unit are grooves and further including a cylindrical bushing operatively positioned on the guide shaft for accommodating excess space between the guide shaft and the grooves.

9. The headlight unit according to claim 1, and further including a vibration isolation bushing operatively positioned between the elongated holes in the lower headlight supporting portions and the support member for suppressing transmission of vibrations to the headlight unit.

10. The headlight unit according to claim 1, wherein the elongated holes of the upper headlight supporting portions are U-shaped openings.

11. The headlight unit according to claim 1, wherein the grooves of the upper headlight supporting portions are U-shaped openings.

12. A headlight unit adapted for selective swinging motion on a support member of a vehicle body, wherein a vertical adjustment of an optical axis is performed by swinging said headlight unit comprising:
upper headlight supporting portions formed at a rear portion of said headlight unit as elongated holes in at least one of said headlight unit and said support member and a guide shaft provided on the other of said headlight unit and said support shaft and engaged with said elongated holes; and
lower headlight supporting portions formed at a rear portion of said headlight unit as elongated holes in at least one of said headlight unit and said support member and a guide shaft provided on the other of said headlight unit and said support shaft and engaged with said elongated holes;
said elongated holes formed at said upper headlight supporting portion and said elongated holes formed at said lower headlight supporting portions arcuately extending along the arcs of concentric circles about a virtual pivot center;
wherein said guide shaft provided at each of said upper and lower headlight supporting portions is adapted to slide in said respective elongated holes to perform the swing motion of said headlight unit about said virtual pivot center,
wherein the elongated holes formed at the upper headlight supporting portions arcuately extend along an arc having a first predetermined radius and the elongated holes formed in the lower headlight supporting portions arcuately extend along an arc having a second predetermined radius that is smaller relative to the first predetermined radius.

13. The headlight unit according to claim 12, wherein
said support member are integral with a body cover as a part of said vehicle body; and
said grooves of said upper headlight supporting portion are formed on said headlight unit and the guide shaft of the upper headlight supporting portion is formed on said support member.

14. The headlight unit according to claim 13, wherein the inner wall of said elongated holes of the upper headlight supporting portion are openings, said guide shaft being adapted to engage with the openings.

15. The headlight unit according to claim 13, wherein
said at least one mounting screw being tightened to fix said headlight unit to said support member at a predetermined position.

16. The headlight unit according to claim 12, wherein
a front portion of said headlight unit is exposed from an opening of an exterior part of said vehicle body;
said virtual pivot center being located in the vicinity of said opening of said exterior part.

17. The headlight unit according to claim 12, wherein said support member is a radiator cover, the elongated holes in the upper headlight supporting portions are grooves formed in the headlight unit for accommodating the guide shaft formed in the radiator cover, and the elongated holes in the lower headlight supporting portions are elongated holes formed in the radiator cover for accommodating the guide shaft for securing the headlight unit to the radiator cover.

18. The headlight unit according to claim 12, wherein the headlight unit includes a lower base portion and said first predetermined radius is larger relative to the second predetermined radius for positioning the lower base portion on a front upper side of a body frame.

19. The headlight unit according to claim 12, and further including a cylindrical bushing operatively positioned on the guide shaft for accommodating excess space between the guide shaft and the grooves.

20. The headlight unit according to claim 12, and further including a vibration isolation bushing operatively positioned between the elongated holes in the lower headlight supporting portions and the support member for suppressing transmission of vibrations to the headlight unit.

* * * * *